(12) United States Patent
Herrmann et al.

(10) Patent No.: US 8,602,570 B2
(45) Date of Patent: Dec. 10, 2013

(54) EXTERIOR REAR VIEW MIRROR

(75) Inventors: Andreas Herrmann, Winnenden-Baach (DE); Istvan Szmolenszki, Schwaikheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 213 days.

(21) Appl. No.: 13/164,872

(22) Filed: Jun. 21, 2011

(65) Prior Publication Data

US 2011/0317297 A1 Dec. 29, 2011

(30) Foreign Application Priority Data

Jun. 28, 2010 (EP) .................................. 10167558

(51) Int. Cl.
*G02B 5/08* (2006.01)
*G02B 7/18* (2006.01)

(52) U.S. Cl.
USPC ............................................ 359/841; 359/844

(58) Field of Classification Search
USPC ................................................ 359/841, 844
See application file for complete search history.

(56) References Cited

U.S. PATENT DOCUMENTS

| | | |
|---|---|---|
| 4,407,534 A | 10/1983 | Petz |
| 4,948,085 A | 8/1990 | Mittelhauser |
| 5,880,895 A * | 3/1999 | Lang et al. .................... 359/841 |
| 6,066,933 A | 5/2000 | Ponziana |
| 7,874,687 B1 * | 1/2011 | Boddy et al. .................. 359/841 |

FOREIGN PATENT DOCUMENTS

| | | |
|---|---|---|
| EP | 0799745 | 10/1997 |
| EP | 0854297 | 7/1998 |
| FR | 2801258 | 5/2001 |

OTHER PUBLICATIONS

European Search Report for application No. EP 10 16 7558 dated Sep. 17, 2010.

* cited by examiner

*Primary Examiner* — Jade R Chwasz
(74) *Attorney, Agent, or Firm* — Reising Ethington PC (57) ABSTRACT

An exterior rear view mirror for a motor vehicle, which exterior rear view mirror consists of at least two components which are connected to each other. At least one connection between the components includes at least one connecting arrangement, which is suitable for transfer of both transverse forces and compression forces and tractive forces, as well as transfer of moments from a first component to a second component. The connecting arrangement comprises a spring arranged on the first component, with inclined flanks, diverging at least in sections, seen from the first component, and a receiving groove, which is assigned to the spring, provided on the second component. The spring engages in the receiving groove. The spring and the receiving groove comprise a complementary, positive interlocking cross-section, at least in sections, so that the inclined flanks and the receiving groove form a rearward engagement normal to the receiving groove.

8 Claims, 7 Drawing Sheets

EXTERIOR REAR VIEW MIRROR

The invention is based on a priority patent application EP 10167558.5 which is hereby incorporated by reference.

BACKGROUND ART

1. Field of the Invention

The invention relates to an exterior rear view mirror for a motor vehicle, which consists of at least two components connected together, whereby at least one connecting element comprises at least one connecting arrangement, which is suitable for transfer of both transverse forces and compression forces and tractive forces, as well as transfer of moments from a first component to a second component, wherein, the connecting arrangement comprises a spring arranged on the first component, with inclined flanks, diverging at least in sections, seen from the first component, and a receiving groove, provided on the second component, which is assigned to the spring, whereby the spring engages with the receiving groove, and the spring and the receiving groove comprise a complementary, positive interlocking cross-section, at least in sections, in such a way that the inclined flanks and the receiving groove form a rearward engagement normal to the receiving groove.

2. Description of the Related Art

An exterior rear view mirror assembly for a motor vehicle consists, for example, of a mirror base attached to the motor vehicle, which can be covered by a minor base cover, and an exterior rear view mirror arranged on the mirror base. The mirror base can be produced, for example, from a die casting material resistant to the forces and moments which occur. The exterior rear view mirror includes an exterior rear view mirror housing, which, among others, houses the base bracket assigned to the mirror base.

The mirror base and the base bracket are hinged together, so that the exterior rear view minor can be pivoted about a hinge axis towards the mirror base from an operating position to a folding point and vice versa. In this process, bearing means can be provided between the mirror base and the base bracket, in order to keep wear and tear and frictional forces arising during pivoting as low as possible.

Preferably, the base bracket is also produced as a die-cast part from a material resistant to the occurring forces and moments, for example, from the same material as the minor base. An adjusting device for a mirror glass, driven by an electric motor, for example, is arranged on the minor base. The adjusting device acts on a backing plate, on which the mirror glass is arranged. The mirror glass can be mounted onto the backing plate by means of an adhesive connection, for example. The backing plate can be guided to and/or mounted on the adjustment device and/or on the base bracket. The term 'backing plate' here refers to a bracket, which comprises at least one bracket surface, with a plane or vaulted design, closed or in a non-continuous grid, for example, honeycombed, on which it is suitable to attach a mirror glass, for example by means of an adhesive connection or by clipping e.g. locking means, protruding behind the perimeter of the backing plate and arcing inwards towards the centre of the backing plate, seen from the perimeter.

On its rear side, facing away from the direction of movement of the motor vehicle in the operating position, the exterior rear view minor housing comprises an opening, through which the minor glass is visible, or in which the minor glass is arranged. In order to ensure that the minor glass is adjustable, a distance is kept on all sides between the minor glass or backing plate and the walls of the exterior rear view minor housing surrounding the opening, so that a gap is given around the minor glass between the walls of the exterior rear view minor housing surrounding the opening.

Additionally, the exterior rear view minor can comprise a turn signal indicator, a heatable minor glass, an electrochromatically dimmable minor glass, a recording and/or warning display module for a driving assistance device, such as blind spot monitoring, a lane departure warning, approach monitoring, or similar, or a combination thereof. Alternatively or additionally, the exterior rear view mirror can also comprise at least one sensor for recording driving and/or surrounding conditions, such as for example, temperature, brightness, degree of pollution, lighting situation, for example, in order to automatically heat the minor glass, or to dim electrochromatically, for example.

For example, in order to simplify the assembly of the different components at least partly housed in the inside of the exterior rear view mirror housing, component groups as well as, if necessary, their electrical connections between each other and/or to a control unit housed on the motor vehicle side, the exterior rear view mirror can be designed in at least two parts. A first housing part forms the housing base, for example, and a second housing part forms the housing cover. At the same time, one of both housing parts can include the housing section lying around the opening for the mirror glass, with the walls surrounding the opening.

In summary, an exterior rear view mirror of an exterior rear view mirror assembly consists of several components connected to each other, for example, a one-piece of multi-piece exterior rear view mirror housing, a base bracket housed therein, as well as, if necessary, a turn signal indicator module, at least partly housed in the exterior rear view mirror housing, for a turn signal indicator.

SUMMARY OF THE INVENTION

The object in the development and production of motor vehicle parts, such as perhaps an exterior rear view mirror assembly or an exterior rear view minor, is a simple and cost-effective production, as well as a time-saving assembly.

Exterior rear view minors with assembly concepts, which include time-consuming connection methods between individual components or component groups, are contrary to this objective. Examples of connections which are at least expensive to produce and/or require a time-consuming assembly are catches and/or screw connections.

An exterior rear view minor assembly of a motor vehicle is known in EP 0 799 745 B1. Here the subject is a big exterior rear view minor assembly for a commercial vehicle. A big exterior rear view minor assembly substantially differs from an exterior rear view minor assembly described at the outset, first of all, evidently, in that the exterior rear view minor housing is not arranged on a minor base, but is adjustably arranged about a first vertical hinge axis on the vertically extending section of a C-shaped minor base bracket, and in that the horizontally extending sections of the C-shaped mirror base bracket are pivotally arranged on the body side about a second vertical hinge axis, so that the minor base bracket, together with the exterior rear view minor, is adjustable about a second vertical hinge axis in relation to the body, from an operating position to a folding point and vice versa. In order to prevent vibrations of the exterior rear view minor without essentially denying the option of pivoting the minor base bracket from an operating position into a folding point and vice versa, a releasable supporting beam is provided, which detachably connects at one end to the mirror base bracket, and is hinged at the other end for stabilising the mirror base bracket on the body. In a latched state, the supporting beam forms a rigid triangle base, on which the mirror base bracket is stabilised. The detachable connection between the supporting beam and the minor base bracket provides on the minor base bracket a receiving groove running essentially transversely to the plane formed by the mirror base bracket, with its ends open, and a connector head on the supporting beam engaging in this receiving groove with a friction fit. The receiving groove and the connector head comprise a complementary, dove-tailed interlocking cross-section.

A rain sensor is known in U.S. Pat. No. 6,066,933, which can be arranged between a base of an interior rear view mirror arranged on the inner side of a windscreen of a motor vehicle, and a slot for the base arranged on the inner side of the windscreen. The carrier and the slot are connected to each other in a dove-tail manner. The rain sensor comprises a housing with a complementary form, which facilitates the arrangement of the rain sensor between the base and the slot.

An object of the invention is to develop an exterior rear view mirror for a motor vehicle, which allows for a simple and cost-effective production and assembly.

The object is achieved by at least two components connected together, whereby at least one connecting element comprises at least one connecting arrangement, which is suitable for transfer of both transverse forces and compression forces and tractive forces, as well as transfer of moments from a first component to a second component, wherein, the connecting arrangement comprises a spring arranged on the first component, with inclined flanks, diverging at least in sections, seen from the first component, and a receiving groove, provided on the second component, which is assigned to the spring, whereby the spring engages with the receiving groove, and the spring and the receiving groove comprise a complementary, positive interlocking cross-section, at least in sections, in such a way that the inclined flanks and the receiving groove form a rearward engagement normal to the receiving groove.

Accordingly, an exterior rear view minor for an exterior rear view minor assembly of a motor vehicle is provided, which consists of at least two components connected to each other. The connection between the components includes at least one connecting arrangement, across which connecting arrangement, forces can preferably be transferred in the direction of at least two differently oriented, intersecting axes, and moments can be transferred about three differently oriented, intersecting axes from a first component to a second component. The connecting arrangement is distinguished by a spring arranged on the first of both components with inclined flanks, diverging at least in sections, seen from the first component, and a receiving groove provided on the second of both components, assigned to the spring, with at least one end open, for example. The spring engages in the receiving groove. The spring and the receiving groove comprise a complementary, positive interlocking cross-section, at least in sections. The complementary cross-sections of the inclined flanks and the receiving groove form a rearward engagement normal to the receiving groove, so that the connecting arrangement is in the position to transfer both transverse forces and compression forces and tractive forces, as well as moments in all three spatial directions between the first and second component.

The spring and the receiving groove can interlock with each other in a dove-tailed manner, or can interlock in the manner of a Christmas tree base, as in turbo aircraft engines for connection of blades and shafts of a rotor.

The receiving groove and spring can be arranged tapering conically in the direction of a longitudinal extension of the connecting arrangement. The spring, which is perpendicular to the receiving groove, can therefore be inserted into the latter, and by being pushed into each other, the connection can subsequently be produced in the direction of the conical tapering.

Alternatively or additionally, it is possible that the receiving groove comprises at least one section, which comprises a cross-section which facilitates insertion of the spring perpendicular to the receiving groove. It is also possible that the receiving groove is open on at least one end for insertion of the spring. The actual production of the connection subsequently takes place by pushing the spring into the receiving groove in the direction of the longitudinal extension of the receiving groove or connecting arrangement.

In order to ensure it is protected from extraction, the spring can be secured in the receiving groove by means of a locking connection, for example, against extraction:
   in the opposite direction to the conical tapering, or
   towards the section with the cross-section which facilitates the insertion of the spring, or
   towards the open end of the receiving groove.

A locking connection, also denoted as a clip connection or a snap connection, includes corresponding locking elements, of which at least one is elastically deformable, and following a deformation, hooks detachably or inextricably with at least another to produce the locking connection. Examples of corresponding locking elements of this type are a rearward engagement and an elastically deformable locking means engaging in this.

The receiving groove and spring can lie:
   perpendicular to or
   at an angle to or
   within
   a plane running through the components to be connected to each other. If a section, along which two components are to be joined together, runs in three dimensional curved space outside of a plane, the receiving groove and spring of a connection arrangement, for example, lie
   locally perpendicular to or
   locally at an angle to or
   locally within
   a plane running through the components to be connected to each other.

The receiving groove and spring can be implemented, for example, within a plane or running in three dimensional curved space. For example, both the receiving groove and the spring can follow a convex or concave contour of a section, along which two components are to be connected to each other. The curvature can be constant here, or it can also be variable. The direction of curvature, determined by the sign of the curvature, along the receiving groove and the spring preferably remains constant, however, so that the receiving groove and the spring are free of turning points. Particularly preferably, a variable curvature constantly increases or decreases, whereby the assembly of the connecting arrangement is made considerably easier in comparison to a curvature which increases and decreases in parts.

If several connecting arrangements are provided for connecting two components, their receiving grooves and springs can be arranged following a curved course.

If several connecting arrangements are provided for connecting two components, their receiving grooves and springs preferably run parallel to each other. In the case of the parallel course, all receiving grooves and springs comprise the same orientations in space, at least in sections.

A connection between two components and/or component parts of the exterior rear view minor can be produced exclusively by one or several of the connecting arrangements described, or other connecting means, for example, screws, locking connections etc can be provided, in addition to the at least one connecting arrangement. If several of the described connection arrangements are provided, these can be designed for simplifying the assembly, for example, or can have different designs for avoiding errors in production of connections between several components.

The exterior rear view mirror preferably consists at least of an exterior rear view minor housing, in which further components can be at least partly housed. The exterior rear view mirror housing can house at least one base bracket, on which a mirror glass is arranged, which is adjustable by an electric motor, for example. On its rear side, the exterior rear view mirror housing comprises an opening for the mirror glass. The exterior rear view mirror housing can consist of at least of a first housing part and a second housing part, both of which can be connected to the base bracket, which is provided if necessary. One of both housing parts can include a housing section lying around the opening for the mirror glass, with the walls surrounding the opening. The first housing part and the second housing part border each other along at least one joint. The housing parts can be connected to each other or to another component at least partly housed in the exterior rear view minor housing by means of at least one connecting arrangement.

At least in the case of a first component, which is connected to the second component by means of the connecting arrangement, there can be a turn signal indicator module for a turn signal indicator, at least partly housed in the exterior rear view mirror housing, with at least one section including at least one light-emitting surface provided for fulfilling the turn signal indicator function. The second component preferably concerns the exterior rear view mirror housing of the exterior rear view mirror or a housing part of a multi-part exterior rear view minor housing. In the process, the at least one section preferably extends along a section between the first housing part and the second housing part of the exterior rear view minor housing.

Among others, advantages of the invention in relation to the prior art result from a simple and low-error production of the connection between components and component groups, together with a low assembly effort and low assembly costs. Assembly of a multi-part exterior rear view minor is simplified by connecting two components or component groups by means of the connecting arrangement according to the invention, in such a way that, for example, a turn signal indicator module with a turn signal indicator can be installed in the exterior rear view minor in a simple and reproducible way. In addition, the connecting arrangements described are more cost-effective in production as locking connections which can transfer transverse and tractive forces, for example.

Among others, advantages of the invention in relation to the prior art result from a simple assembly concept for the exterior rear view minor created by the connecting arrangement, which dispenses with time-consuming connecting methods. A time-saving and cost-effective production of the exterior rear view mirror is thus facilitated. The connecting arrangement is suitable for connections, for example, between both housing parts, as well as between housing parts and further components, such as a turn signal indicator module.

It is important to emphasise that the expressions first and second component, first and second housing part, as well as the terms first and second in general, do not denote any order or concrete instructions for use, but simply serve for differentiation and are exchangeable in any way.

Further features of the invention result from the claims, description and drawings.

BRIEF DESCRIPTION OF THE DRAWINGS

Advantages of the invention will be readily appreciated as the same becomes better understood by reference to the following detailed description when considered in connection with the accompanying drawings, wherein:

Embodiments of the invention are subsequently explained in more detail by means of the drawings. Identical reference characters denote identical or identically acting elements. In the drawings, shown schematically:

FIG. 2 is a schematic diagram of a connecting arrangement in FIG. 2*a*) in a disassembled state, from a perspective view, in FIG. 2*b*) in a disassembled state, from a side view, in FIG. 2*c*) in an assembled state, from a perspective view, and in FIG. 2*d*) in an assembled state in a side view.

FIG. 5 shows a first exterior rear view minor housing, in at least two parts, whereby FIG. 5*a*) shows a first part forming a housing base, from a front view, and FIG. 5*b*) shows a second housing part forming a housing cover, from a front view, whereby the first housing part comprises a housing section lying around the opening for a mirror glass, with the walls surrounding the opening.

FIG. 6 shows a second exterior rear view mirror housing, in at least two parts, whereby FIG. 6*a*) shows a first part forming a housing base, from a top view, and FIG. 6*b*) shows a second housing part forming a housing cover, from a perspective view, whereby the second housing part comprises a housing section lying around the opening for a minor glass, with the walls surrounding the opening.

FIG. 7 shows a first turn signal indicator module to be connected to an exterior rear view minor housing in FIG. 7*a*) from a front view, and in FIG. 7*b*) from a top view.

DETAILED DESCRIPTION OF THE PREFERRED EMBODIMENT

Figure 1:
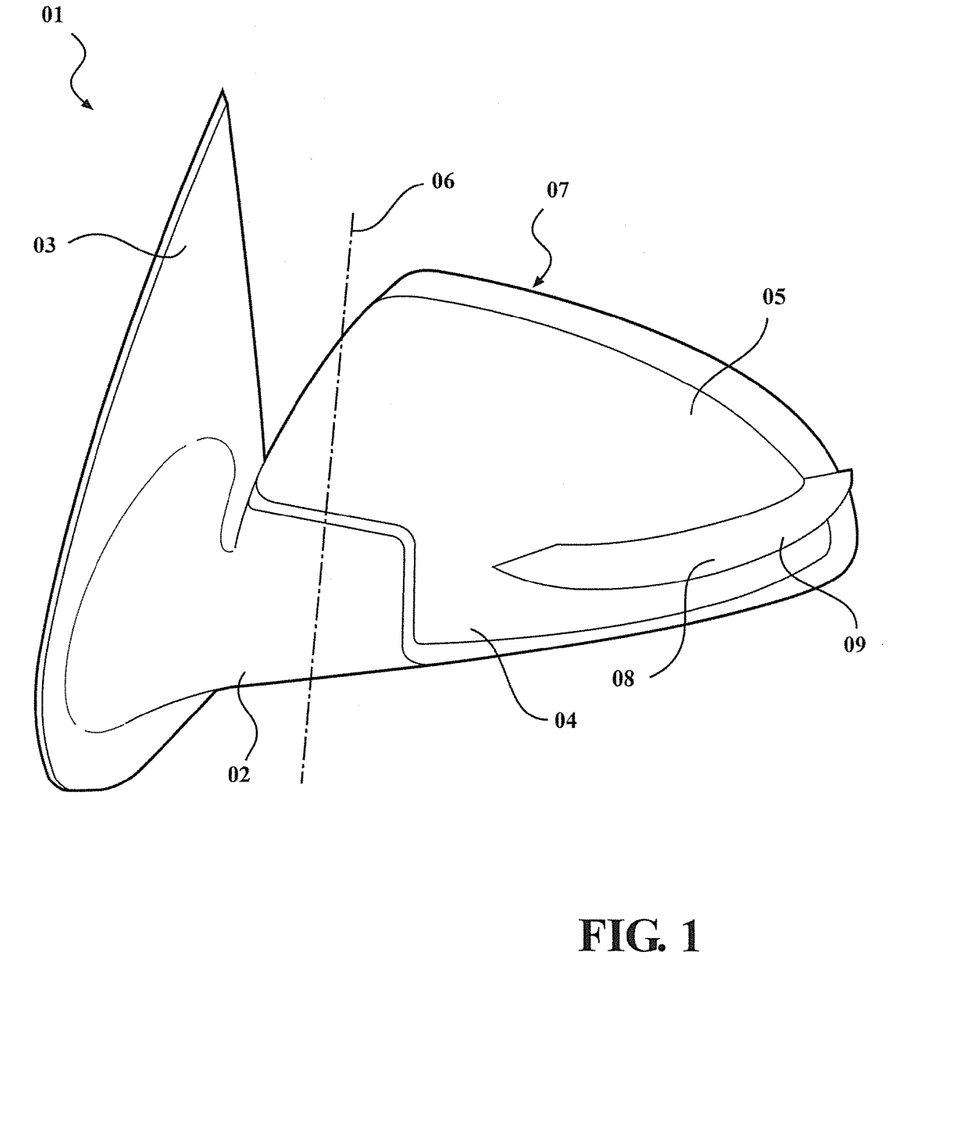
FIG. 1 is a rear view mirror assembly from a perspective view.

An exterior rear view minor assembly 01 for a motor vehicle, shown in FIG. 1, consists, for example, of a minor base 02 arranged on or attached to the motor vehicle, which can be covered by a minor base covering 03, and an exterior rear view mirror 04 arranged on the minor base 02. The exterior rear view mirror 04 consists of several, though at least two, components which are connected to each other. For example, the exterior rear view mirror 04 includes an exterior rear view minor housing 05, in which, among others, the base bracket 20 (FIG. 5) assigned to the mirror base (02) can be housed. The minor base 02 and the base bracket 20 are hinged together, so that the exterior rear view minor 04 can be pivoted about a hinge axis 06 in relation to the minor base 02 from an operating position to a folding point and vice versa. On its rear side 07, facing away from the direction of movement of the motor vehicle in the operating position, the exterior rear view minor housing 05 comprises an opening 21, through which the minor glass is visible, or in which the minor glass is arranged. The minor glass can be arranged on a backing plate 22, which is adjustably mounted in the exterior rear view minor housing 05, by means of an adjustment device driven by an electric motor, for example, on the base bracket 20.

The exterior rear view minor 04 can comprise a turn signal indicator module 08, at least partly housed in the exterior rear view minor housing 05, for a turn signal indicator, with at least one section, including at least one light-emitting surface 09 provided for fulfilling the turn signal indicator function. The turn signal indicator module 08 is connected to the exterior rear view minor housing 05, for example.

At least two components of the exterior rear view minor 04, for example, the exterior rear view mirror housing 05 and the base bracket, as well as, if necessary, as an alternative or additionally, the exterior rear view minor housing 05 and the turn signal indicator module 08, can be connected to each other in such a way that both forces and moments can be transferred across the connection along or about axes between the two components lying anywhere in the space.

Figures 2A, 2B:
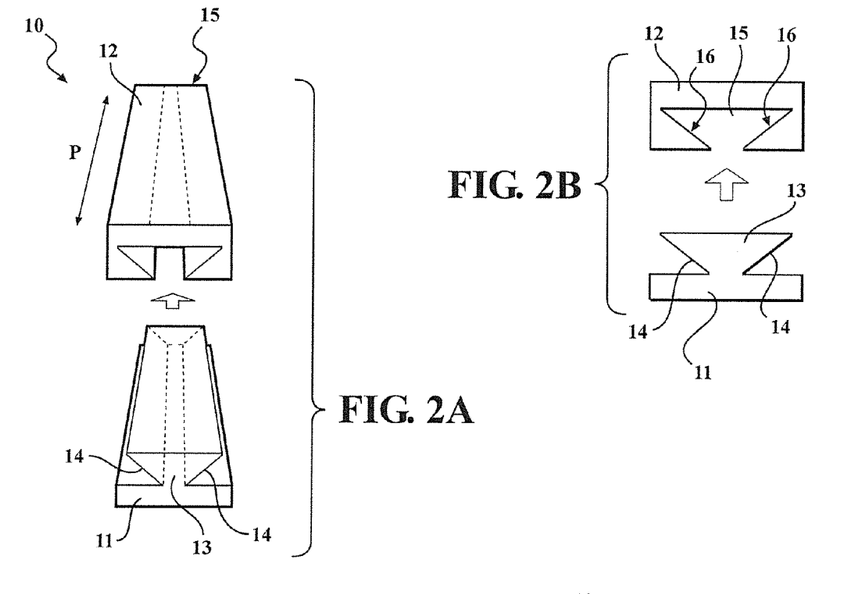
Figure 2C:
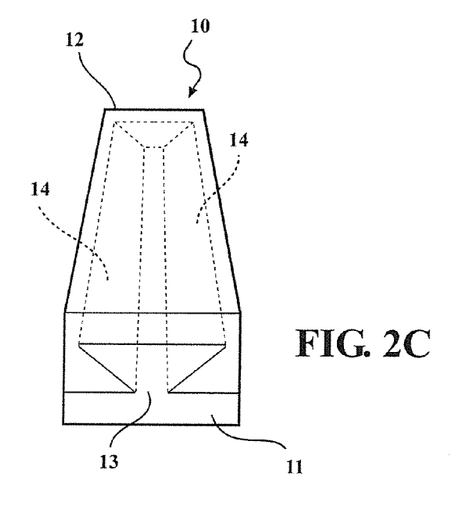
Figure 2D:
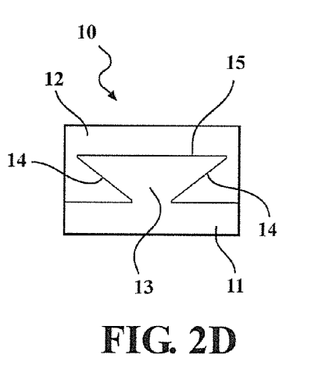

At least one connection between the two components of the exterior rear view mirror 04 includes, at least one connection arrangement 10, shown in FIGS. 2a), b), c) and d), which in principle is suitable for transfer of both transverse forces and compression and tractive forces, as well as moments, from a first component 11 to a second component 12. The connecting arrangement 10 comprises a spring 13 arranged on the first component 11 with inclined flanks 14, diverging at least in sections, seen from the first component 11, and a receiving groove 15, assigned to the spring 13, provided on the second component 12. The spring 13 engages with the receiving groove 15 (FIG. 2c) and d)). The spring 13 and the receiving groove 15 comprise a complementary, positive interlocking cross-section, at least in parts, so that the inclined flanks 14 and the receiving groove 15 form a rearward engagement 16 normal to the receiving groove 15 (FIG. 2b)).

In the process, the spring 13 and the receiving groove 15 can interlock with each other in a dove-tail manner, for example, or in the manner of a Christmas tree base. Alternatively or additionally, the receiving groove 15 and the spring 13 can be arranged tapering conically in the direction of a longitudinal extension of the connecting arrangement 10, schematically shown in FIG. 2a) by a double arrow P.

Figure 3:
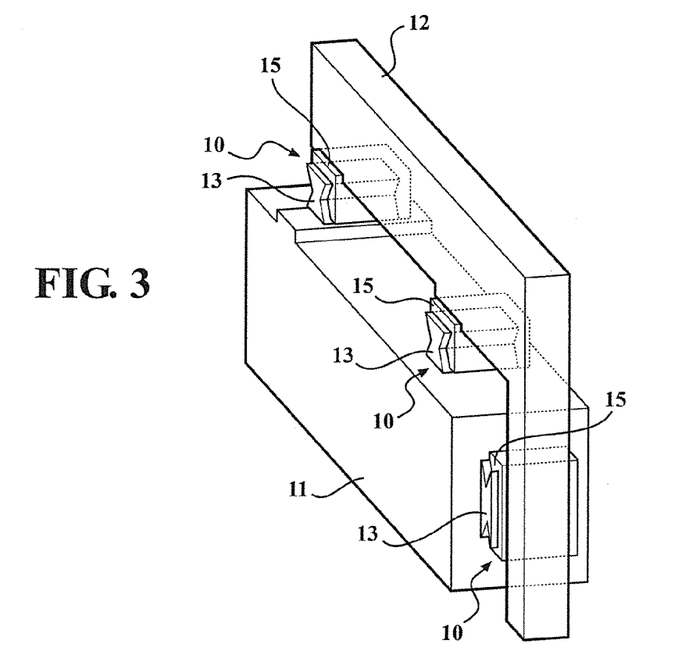
FIG. 3 a connection between a first component and a second component by means of several connecting arrangements from a first perspective view.
Figure 4:
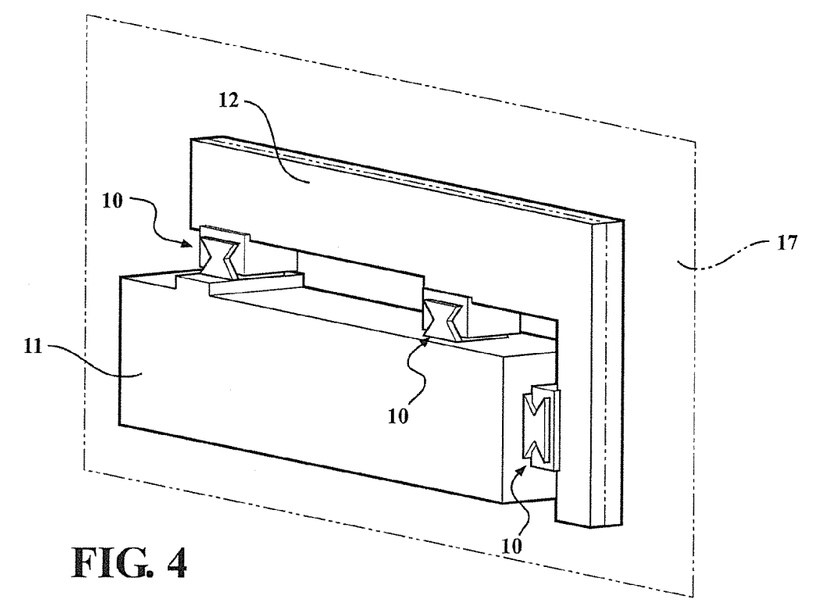
FIG. 4 shows the connection from FIG. 3 from a second perspective view.

As shown in FIGS. 2, 3 and 4, the receiving groove 15 can be open on at least one end, in order to facilitate insertion of the spring 13 by a lateral insertion from the end.

A connection between a first component 11 and a second component 12 can take place by using one or several connecting arrangements 10, as indicated in FIGS. 3 and 4. The receiving groove 15 and the spring 13 of one or several connecting arrangements 10, as shown in FIGS. 3 and 4, can lie perpendicular to a plane 17 running through the components 11, 12, which are to be joined together (FIG. 4). An orientation at an angle or inside of the plane 17 is also possible here. If a section, along which the components are to be connected together, runs outside of a plane e.g. in three-dimensional curved space, the receiving groove 15 and the spring 13 can lie locally perpendicular or locally inclined to a surface at least partly running through the components 11, 12 which are to be connected together, or locally inside of the surface running through the components 11, 12 which are to be connected together. In the process, the receiving grooves 15 and the springs 13 of several connecting arrangements 10, provided for production of the connection between the first housing part 11 and the second housing part 12, comprise the same orientation in space, at least in sections.

Figure 5A:
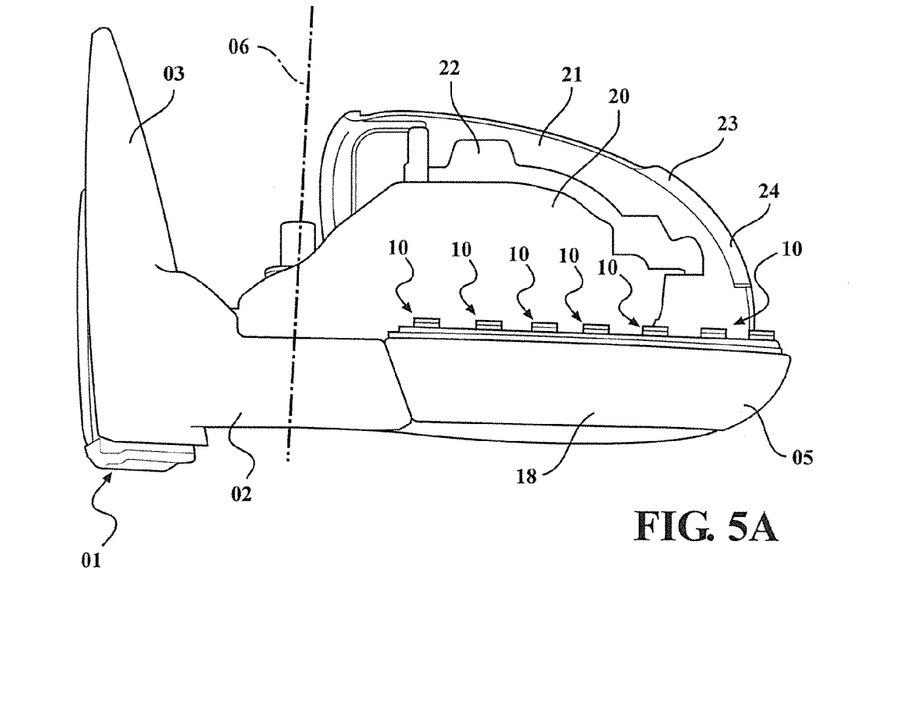
Figure 5B:
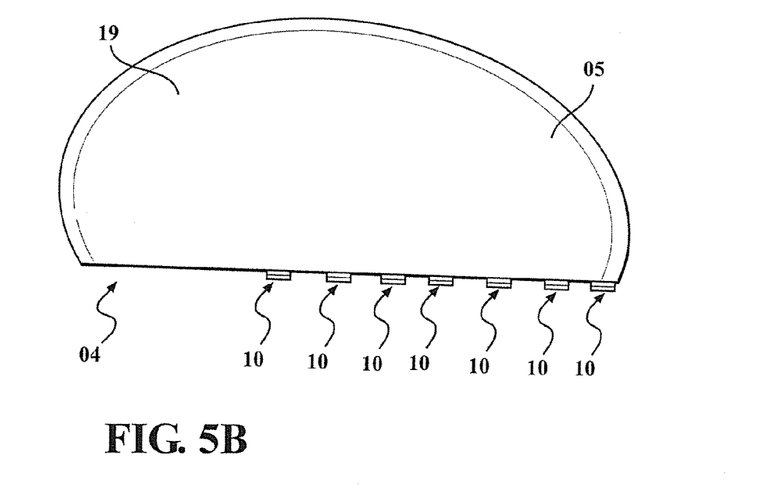
Figure 6A:
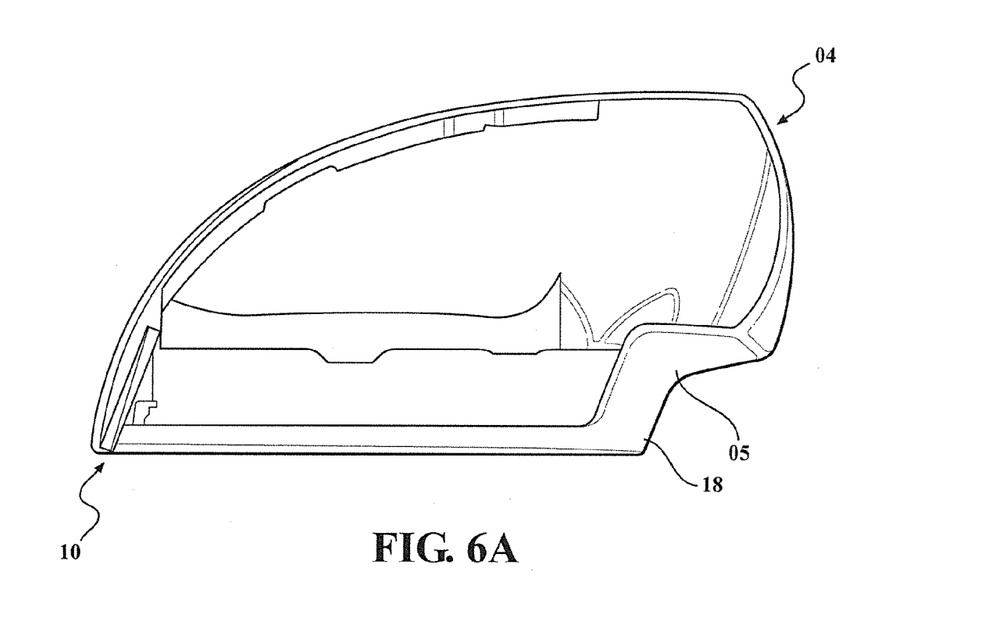
Figure 6B:
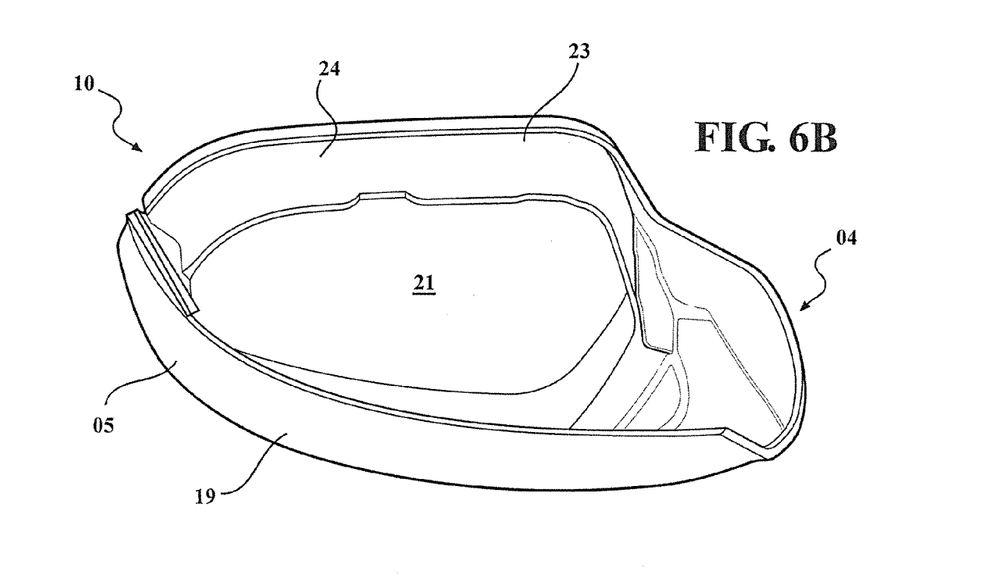

The exterior rear view mirror housing 05 can be designed as one piece, as shown in FIG. 1, or in two or more parts, as shown in FIG. 5 and FIG. 6.

Both the exterior rear view mirror housing 05, shown in FIG. 5, and the exterior rear view mirror housing 05, shown in FIG. 6, consist at least of a first housing part 18 and a second housing part 19, which can be connected together by means of one or several connecting arrangements 10, for example, with a base bracket 20 provided in the exterior rear view mirror housing 05, if necessary. One of both housing parts 18, 19 can include a housing section 23 lying around the opening 21 for the mirror glass, with the walls 24 surrounding the opening 21. The first housing part 18 and the second housing part 19 can border each other along at least one joint.

In the case of the exterior rear view mirror housing 05 in FIGS. 5 and 6, the first housing part 18 forms a housing base, whereas the second housing part 19 forms a housing cover. In the case of the exterior rear view minor housing 05 in FIG. 5, the first housing part 18 includes the housing section 23 lying around the opening 21 for the minor glass, with the walls 24 surrounding the opening 21. In the case of the exterior rear view minor housing 05 in FIG. 6, the second housing part 19 includes the housing section 23 lying around the opening 21 for the mirror glass, with the walls 24 surrounding the opening 21.

The housing parts 18, 19 can be connected to each other, or to another component at least partly housed in the exterior rear view minor housing 05, such as a turn signal indicator module 08 (FIGS. 7, 8, 9) by means of at least one connecting arrangement 10. In principle, it is irrelevant, on which of both housing parts 18, 19 or turn signal indicator module 08 the receiving grooves 15 or springs 13 are arranged, which is why, for the sake of simplicity, on each of the housing parts 18, 19 and the turn signal indicator module 08, a connecting arrangement 10 is denoted representing the freely selectable arrangement of a receiving groove 15 or a spring 13.

Figure 8:
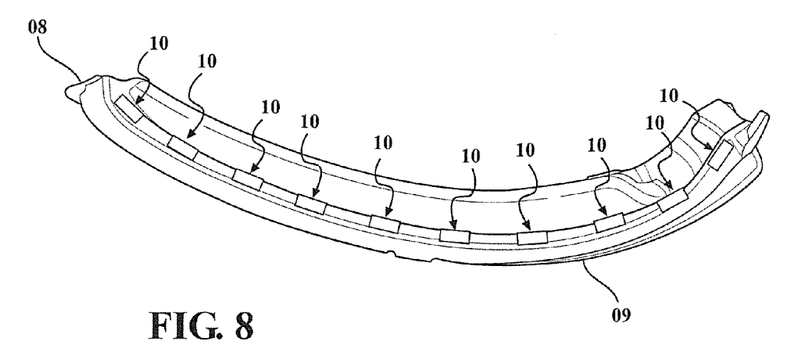
FIG. 8 a second turn signal indicator module to be connected to an exterior rear view minor housing, from a perspective view.
Figure 9:
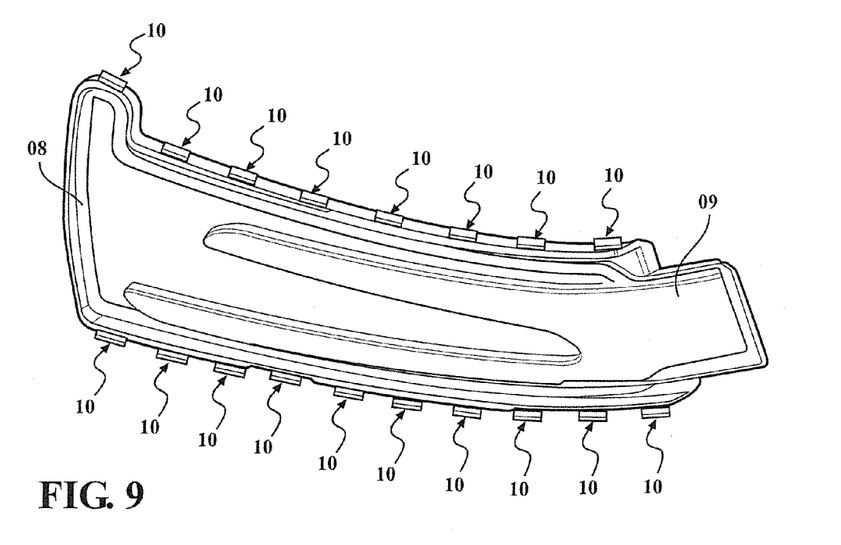
FIG. 9 a third turn signal indicator module to be connected to an exterior rear view minor housing, from a perspective view.

For example, in the case of the exterior rear view mirror 04 of the exterior rear view mirror assembly 01 shown in FIG. 5, several connecting arrangements 10 are provided for connecting the first housing part 18 and the second housing part 19, as well as at least along a section of the joint between the housing parts 18, 19 for connecting the first housing part 18 to a turn signal indicator module 08, shown in FIG. 8 or 9, as well as for connecting the second housing part 19 to the turn signal indicator module 08. The at least one section including at least one light-emitting surface 09 for the turn signal indicator function of turn signal indicator module 08, here preferably extends at least along a section of the joint between the first housing part 18 and the second housing part 19 of the exterior rear view mirror housing 05.

In the process, the receiving grooves 15 and springs 13 of the connecting arrangements 10, are arranged following a curved course of the joint or section between the components which are to be connected to each other, in this case the housing parts 18, 19 and the turn signal indicator module 08. For example, in connecting arrangements 10 with a long longitudinal extension, as an alternative or additionally, the receiving grooves 15 and the springs 13 can be curved following the curve of the contour.

Figure 7A:
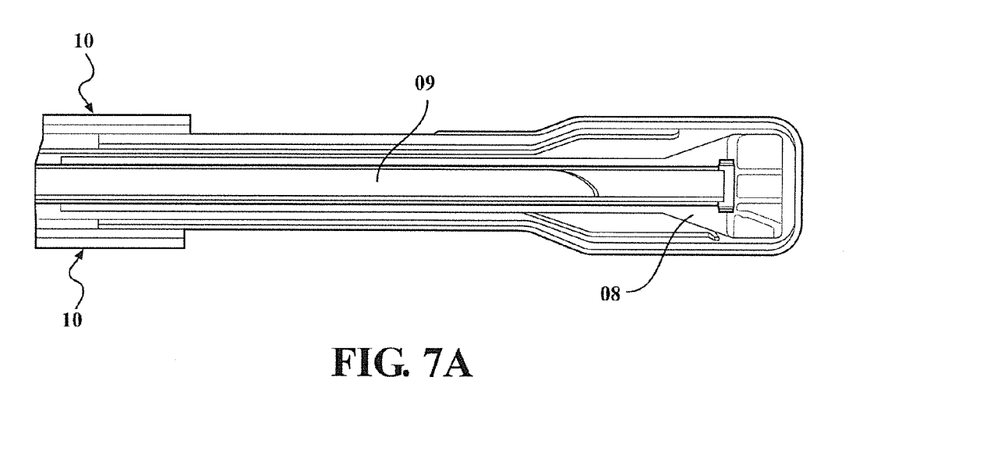
Figure 7B:
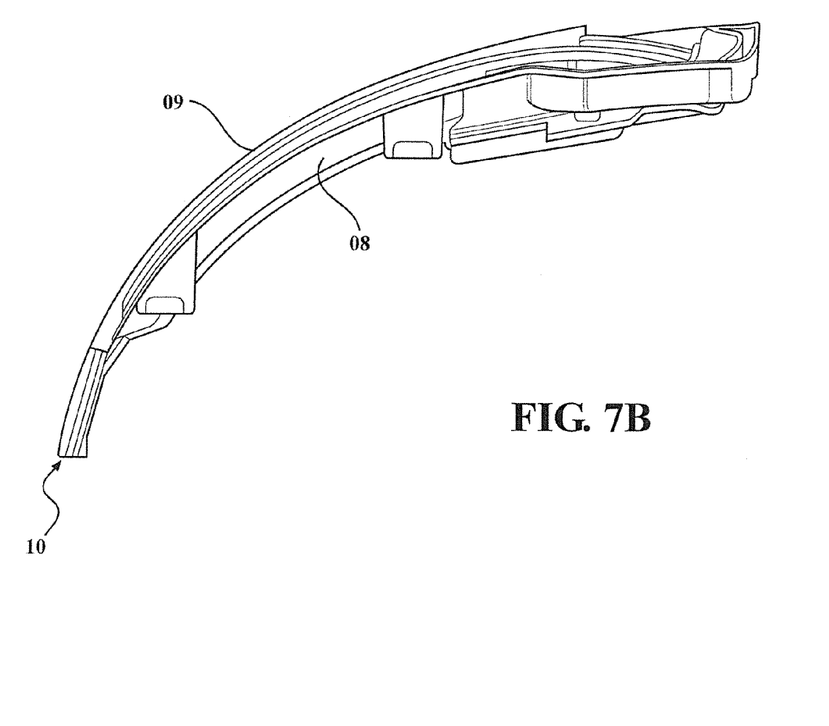

For example, for the exterior rear view mirror 04 in FIG. 6, in each case a connecting arrangement 10 is provided for connection of the first housing part 18 to the turn signal indicator module 08 shown in FIG. 7, for example, as well as for connection of the second housing part 19 to the turn signal indicator module 08. The at least one section including at least one light-emitting surface 09 for the turn signal indicator function of the turn signal indicator module 08, here preferably extends at least along a section between the first housing part 18 and the second housing part 19 of the exterior rear view mirror housing 05.

In the case of the exterior rear view mirrors 04 with multi-part exterior rear view mirror housings 05 in FIGS. 5 and 6, the at least one section of the turn signal indicator module 08 including at least one light-emitting surface 09 provided for fulfilling the turn signal indicator function, here preferably extends at least between the first housing part 18 and the second housing part 19 of the exterior rear view mirror housing 05. The at least one section here borders along a respective section on both of the at least two housing parts 18, 19. The section borders at least the first housing part 18 along at least a first section, and the second housing part 19 along at least a second section. It is possible that the housing parts 18, 19 are not directly connected to each other along these sections, but rather are indirectly connected to each other via the turn signal indicator module 08.

It is also possible to provide a turn signal indicator module 08 in a one-piece exterior rear view mirror housing 05, or inside of a housing part 18, 19 of a multi-part exterior rear view mirror housing 05. The exterior rear view mirror housing 05 or one of the housing parts 18, 19 can here comprise at least one recess assigned to the at least one light-emitting surface 09, which recess being preferably completely taken by the light-emitting surface 09. The recess can at least be partly formed as an opening.

The light-emitting surface 09 of the turn signal indicator module 08 can generally be formed in any way, equally, the recess in the exterior rear view mirror housing 05 or between the housing parts 18, 19, through which the light-emitting surface 09 is visible and/or passes through.

The exterior rear view mirror 04 can provide connecting arrangements 10 for production of connections, at least between the housing parts 18, 19 of the exterior rear view minor housing 05, which is in at least two parts, as well as between the housing parts 18, 19 of the exterior rear view mirror housing 05, which is in at least two parts, and between the components at least partly housed inside of the exterior rear view mirror housing 05, such as a turn signal indicator module 08 and/or a base bracket 20.

Alternatively or additionally to the turn signal indicator module 08, the exterior rear view mirror 04 can house a module and/or a sensor of a driving assistance device and/or a module and/or a sensor for control of a vehicle function, such as for example, for control of the heating and/or automatic dimming of the mirror glass. The module and/or sensor for a driving assistance device can be, for example, a display device for blind-spot monitoring, a lane departure warning or approach monitoring, a receiver for satellite-based position determination or similar, or a combination thereof. The module and/or sensor for control of a vehicle function can be a temperature sensor and/or a brightness sensor, for example. The respective module or the respective sensor can be connected to the exterior rear view mirror housing 05 or to one of both housing parts 18, 19, or to a housing part 18 or 19 or to at least one component at least partly housed inside the exterior rear view mirror housing 05 by means of at least one connecting arrangement 10.

It is important to emphasise that the spring 13 and the receiving groove 15 of a connecting arrangement 10 can be moulded to the respective component.

The invention is particularly commercially applicable in the production of exterior rear view mirrors 04 and exterior rear view mirror assemblies 01 for motor vehicles.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

LIST OF REFERENCE CHARACTERS

01 Exterior rear view mirror assembly
02 Mirror base
03 Mirror base covering
04 Exterior rear view minor
05 Exterior rear view minor housing
06 Hinge axis
07 Rear side
08 Turn signal indicator module
09 Light emitting surface
10 Connecting arrangement
11 First component
12 Second component
13 Spring
14 Flank
15 Receiving groove
16 Rearward engagement
17 Plane
18 First housing part
19 Second housing part
20 Base bracket
21 Opening
22 Backing plate
23 Housing section
24 Wall
P Longitudinal extension of the receiving groove or connecting arrangement

We claim:

1. Exterior rear view mirror, for a motor vehicle, which consists of at least a turn signal indicator module connected to an exterior rear view mirror housing, whereby at least one connecting element comprises at least one connecting arrangement, which is suitable for transfer of both transverse forces and compression forces and tractive forces, as well as transfer of moments from the turn signal indicator module to the exterior rear view mirror housing,
wherein,
the connecting arrangement is constituted by a plurality of springs arranged on the turn signal indicator module each spaced apart from each other, with inclined flanks, diverging at least in sections, seen from the turn signal indicator module, and a plurality of receiving grooves, provided on the exterior rear view mirror housing and spaced apart from each other, which is assigned to each of the plurality of springs, whereby each of the plurality of springs engages directly with each of the plurality of receiving grooves, and each of the pluralities of springs and receiving grooves comprise a complementary, positive interlocking cross-section, at least in sections, in such a way that the inclined flanks and each of the plurality of receiving grooves form a rearward engagement normal to each of the plurality of receiving grooves.

2. Exterior rear view mirror according to claim 1, characterized in that,
each of the plurality of springs and receiving grooves can interlock with each other in a dove-tail manner.

3. Exterior rear view mirror according to claim 1, characterized in that, each of the plurality of receiving grooves and springs are arranged conically tapering in the direction of a longitudinal extension of the connecting arrangement.

4. Exterior rear view mirror according to claim 1, characterized in that,
each of the receiving grooves comprises at least one section, which comprises a cross-section, which facilitates insertion of one of the plurality of springs perpendicular to the one of the plurality of receiving grooves.

5. Exterior rear view mirror according to claim 1, characterized in that,
each of plurality of receiving grooves is open on at least one end for insertion of one of the plurality of springs.

6. Exterior rear view minor according to claim 1, characterized in that,
each of the plurality of springs is protected from extraction by means of a locking connection in each of the plurality of receiving grooves.

7. Exterior rear view mirror according to claim 1, characterized in that,
each of the plurality of receiving grooves and springs lie locally perpendicular or at an angle to or locally inside a plane running at least partly through the components which are to be joined together.

8. Exterior rear view minor according to claim 1, characterized in that,
each of the plurality of springs and receiving grooves are curved.

* * * * *